UNITED STATES PATENT OFFICE.

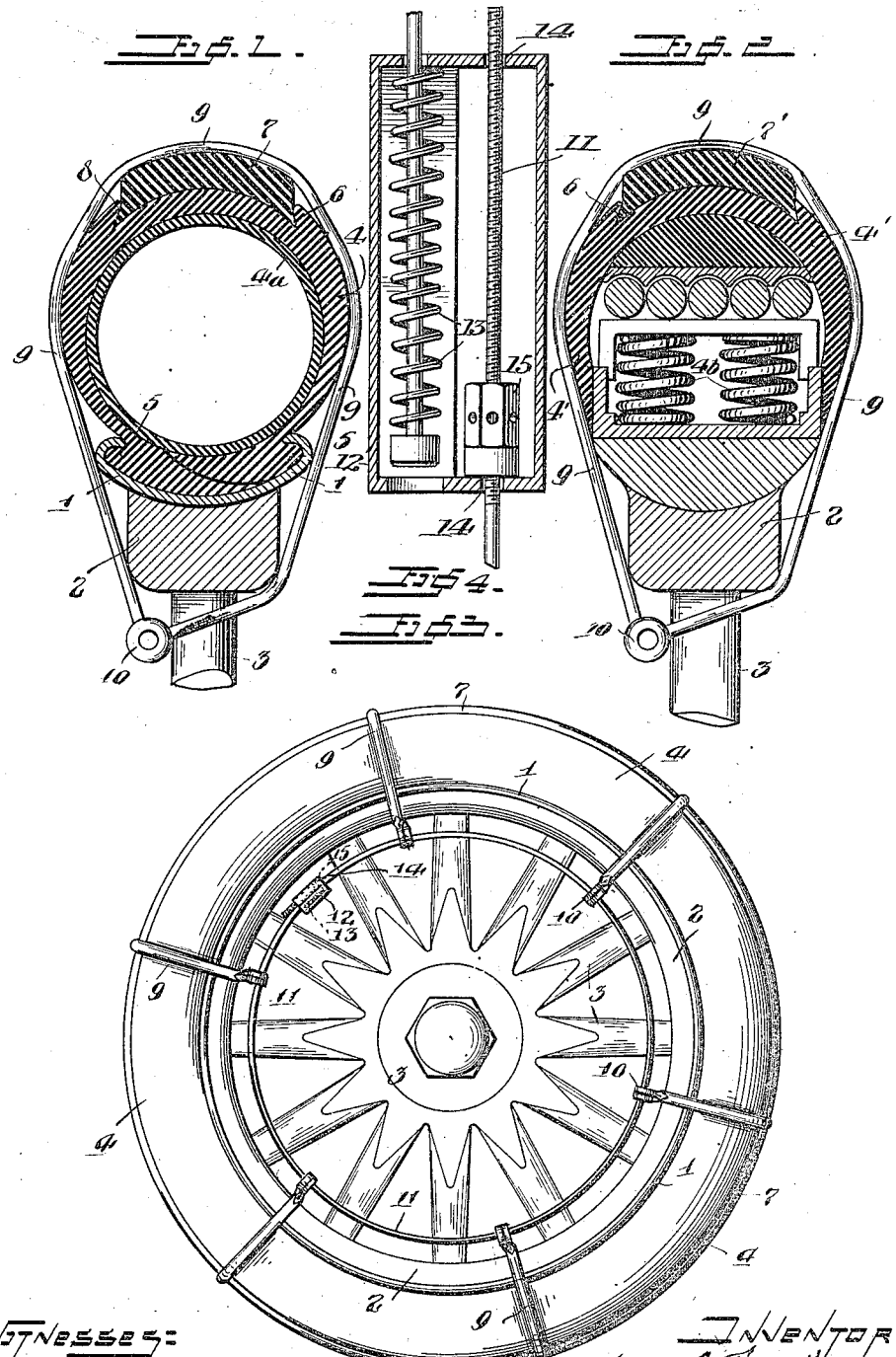

CHARLES F. FORSTER, OF OAK PARK, ILLINOIS.

VEHICLE-TIRE.

1,080,821.

Specification of Letters Patent. Patented Dec. 9, 1913.

Application filed October 4, 1912. Serial No. 723,387.

*To all whom it may concern:*

Be it known that I, CHARLES F. FORSTER, a citizen of the United States, and a resident of the village of Oak Park, in the county of Cook and State of Illinois, have invented a new and useful Improvement in Vehicle-Tires, of which the following is a specification.

My invention relates to vehicle tires, and has for its special object the provision of a tire in which the tread, or that portion which is subject to contact with the road and the wear which is incident to such contact, is separable and may be renewed as occasion may require.

I attain the above object by means of the structure illustrated in the accompanying drawing, in which:

Figure 1 is a transverse section through a vehicle tire embodying my improvement; Fig. 2 is a transverse section through a modified tire construction embodying my invention, and Fig. 3 is an elevation of a wheel equipped with my invention. Fig. 4 is a detail of the spring or tension means for securing the opposite ends of the retaining rod.

Similar reference characters refer to similar parts throughout the views.

Any form of wheel may be employed and any of the usual modes of assembling the tire itself with the wheel may also be employed.

As illustrative of my invention I have shown an ordinary clencher assembly, and a tire with a form of spring filler. In the clencher structure there is provided a clencher rim 1 upon the felly 2 of the wheel 3. The tire consists of the outer casing 4 which is of the usual circular cross section, the longitudinal meeting edges whereof are provided with the clencher ribs 5 which engage the clencher rim 1, as clearly shown in Fig. 1. Inside of the casing 4 is the usual inner or air holding tube, $4^a$.

My invention consists in providing the outer portion or tread of the casing with an annular depression or channel 6, the walls forming the edges of which may be preferably beveled toward the center so as to give the depression 6 a wider dimension upon the bottom than upon the top. Into the depression 6 is inserted the tread 7, which may be made of the ordinary fabric of which casings for tires are at present made, or of any desired material. The edges of the tread are beveled at 8 to fit into the beveled sides of the depression 6 so as to secure the bottom of the insert firmly to the casing. The tread 7 should be of such thickness as to bring it such a distance above the surface of the casing as to receive all of the contact with the road.

In the modified form of my invention shown in Fig. 2, the tire, instead of having an air holding tube, $4^a$, is provided with a spring filler, $4^b$, about which extends a casing, $4'$. In the tread of the casing, $4'$, just as in a casing for a pneumatic tire, is provided an annular channel $6'$ into which is inserted a tread $7'$ similar in all respects to the channel 6 and tread 7 heretofore described. The tread or insert 7 is further secured in position by means of the tread retaining bands 9 which extend entirely around the tire and felly and the ends whereof are provided with eyes 10 which are brought into alinement at one side of the felly.

The bands 9 may be given any desired shape so as to act as a preventive against slipping or skidding as well as for retaining the tire and insert in position. Any desired number of the bands may be disposed about the tire, and, after they are in position, a rod 11 is passed through the alining eyes 10 of the various bands. The ends of the rod 11 may be secured together in any desired way, but I prefer to hold them together by some spring or yielding means which will put the several bands under a tension. Such a rod coupler may consist of a box 12, as shown in Fig. 4, into which box one end of the said rod extends. This end may be provided with a spring 13. The other end of the rod is passed through alining holes 14 provided in the box 12, parallel with the said spring. The end of the rod which passes through the alining holes is threaded and an adjusting screw, 15, is provided in the box 12 between the alining holes 14 by means of which the rod 11 may be given any desired tension.

Having described my invention what I claim as new and desire to secure by Letters Patent, is:—

A vehicle tire comprising a casing, a filler therefor, said casing having provided in the tread thereof an annular channel, a separable insert adapted to fit within said channel, tire retaining bands adapted to surround the tire and felly, alining eyes upon the ends of said bands, a rod adapted to extend through the alining eyes of the several retaining bands, and means for securing the ends of said rod together.

In testimony whereof I affix my signature in the presence of two witnesses.

CHARLES F. FORSTER.

Witnesses:
F. BENJAMIN,
M. A. MILORD.